Oct. 6, 1970 R. R. LARSON 3,532,852
APPARATUS AND METHOD FOR WORKING FINE WIRE
Filed Sept. 19, 1968 2 Sheets-Sheet 2
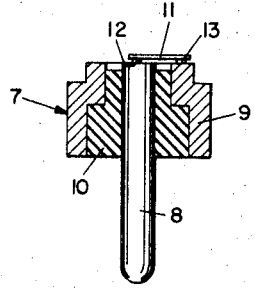
FIG. 8
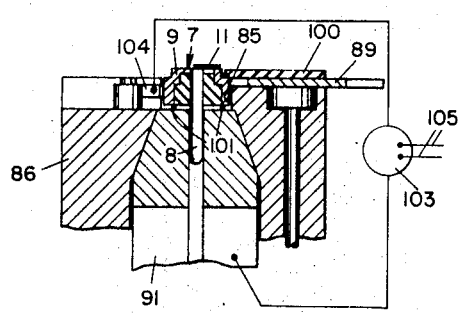
FIG. 7
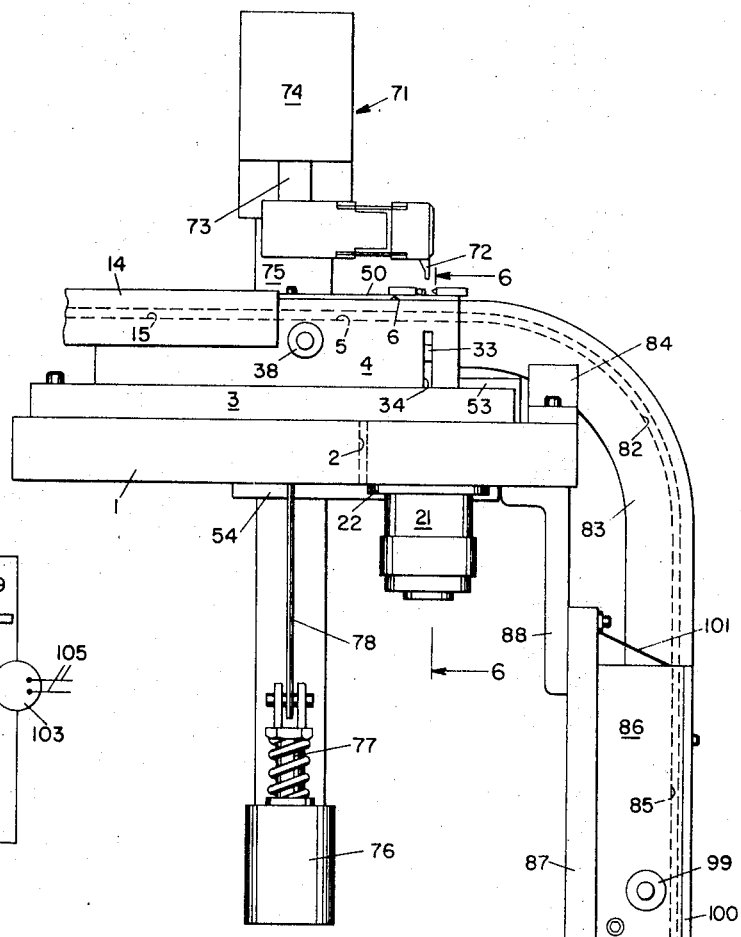
FIG. 2
FIG. 6
RICHARD R. LARSON
INVENTOR.
BY Edward L Bell
ATTORNEY

United States Patent Office 3,532,852
Patented Oct. 6, 1970

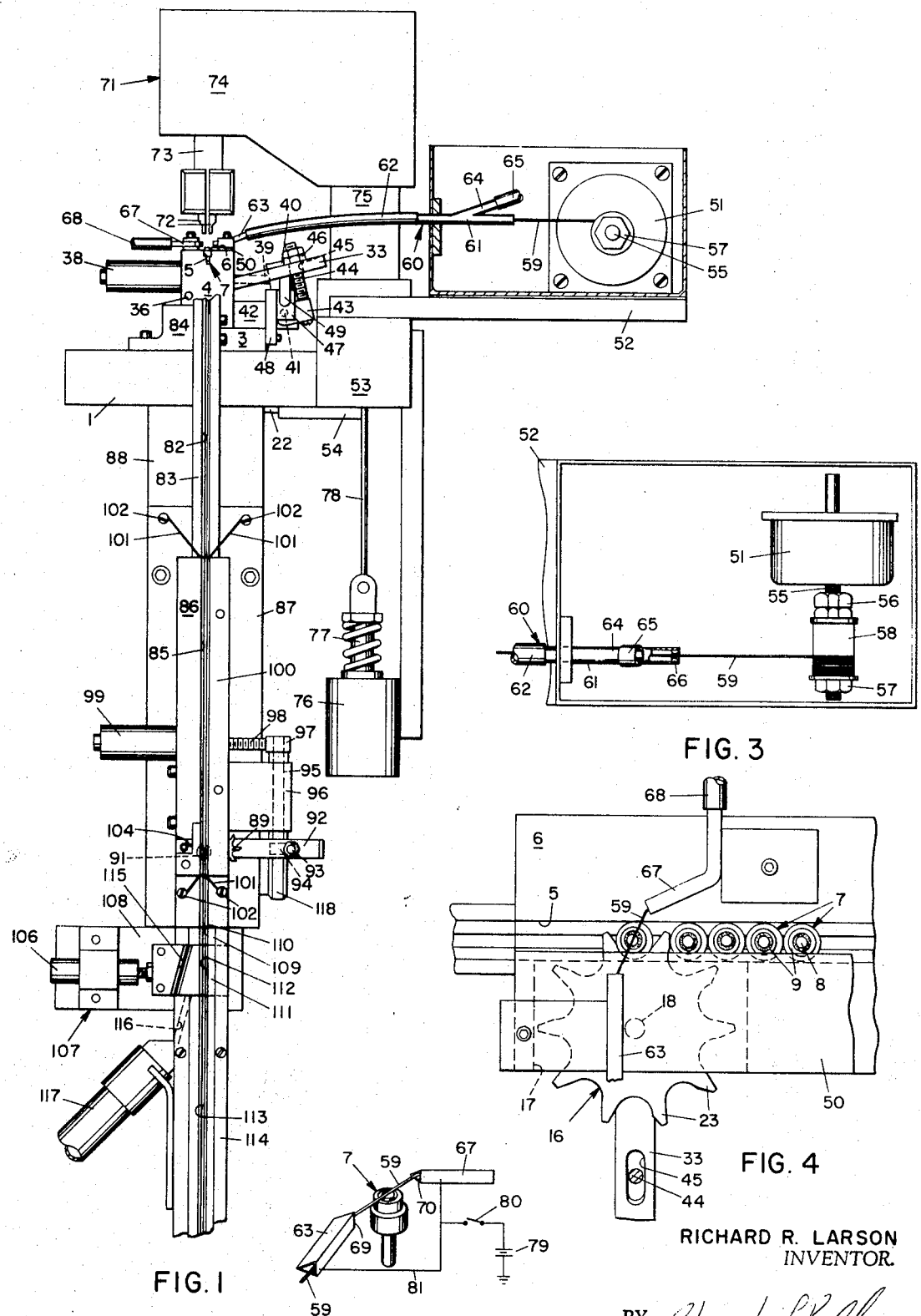

3,532,852
APPARATUS AND METHOD FOR WORKING FINE WIRE
Richard R. Larson, Ulster Park, N.Y., assignor to Hercules Incorporated, Wilmington, Del., a corporation of Delaware
Filed Sept. 19, 1968, Ser. No. 760,906
Int. Cl. B23k 11/00
U.S. Cl. 219—103                                          16 Claims

ABSTRACT OF THE DISCLOSURE

This invention relates to an apparatus and process for working fine wire, that is, wire that may be in order of 0.0002" or less in diameter, and particularly for applying bridge wires to blasting caps. The wire is unwound from a spool which is turned by a stepping motor and is advanced through a conduit to the working position by fluid. A suction tube draws in the free end of the wire on the opposite side of the working position from the conduit so that the wire is accurately positioned over the base of a plug to which it is to be welded. The plugs are fed to the working position by an indexing mechanism and are secured and electrically grounded at the working position by a clamping element having split arms that are normally sprung apart and are closed by cam means to grip the shank of the plug as the clamping element is raised. The ends of the wire outside the bridge portion are severed by passing electrical current therethrough between the weld points and the respective output end of the conduit and the intake of the suction means, which heats the wire and thus burns it off but does not heat the bridge portion. After the plugs are wired, they are passed on the subsequent cycle to a second working position at which the resistance of the bridge wire is checked and at which there is a reject mechanism for rejecting those plugs whose resistance measures outside the desired range.

---

The present invention relates to an apparatus and method for working wire and particularly very fine wire which may for example be less than 0.0002" in diameter.

In applications such as the bridge wires in a blasting cap, the wire is very small so that high ignition temperatures can be obtained with minimum electrical input. In such an application, it is also important that the electrical properties of the wire be held within a very limited range in order to achieve uniform results and high reliability. However, it is very difficult to manipulate extremely fine wire without straining it and thereby altering its electrical properties. At the same time, since the electrical properties of a bridge wire also vary with the length of the wire as well as the electrical resistance of the connections at the ends thereof, the wire must be accurately positioned relative to the bridged elements at the time of connection.

The practice in making bridge wires for blasting caps has heretofore been essentially a hand operation performed by operators observing the work through a magnifying glass. A plurality of the plugs on which the bridge wires are welded are aligned and a length of the wire is pulled from a spool and laid across the bases of the plugs. The wire is then welded across the base of each plug, after which it is cut to separate the plugs and to remove the excess wire. Even when the wire is drawn from the spool with utmost care, which necessarily involves drawing it very carefully at a very slow and uniform rate, the wire is very often stressed enough to vary its electrical properties. Because of these variations in the electrical properties of the wire as well as the variations inherent in the manual selection of a pair of welding points that are spaced a distance of only about 0.04", the reject rate of the finished plugs is very high. Manually severing the wire ends is also slow and tedious work, and there is a high reject rate because the electrical connection at one end of the wire is often broken. The net result is that applying the bridge wires in accordance with present practices is slow and expensive.

The objects of this invention are to provide an apparatus and method for applying fine wire, and particularly for feeding the wire from a supply and effecting the electrical connection thereof, which apparatus and method produce finished products inexpensively at a high production rate and with highly uniform electrical properties. More specifically, the objects of this invention are to effect a manipulation of a fine wire from a supply to a working position without imposing a strain on the wire that would alter its electrical properties and to position the wire accurately at the working position. It is also an object of this invention to provide a method and apparatus for effecting an electrical connection of a wire and for severing the wire and substantially removing the excess lengths thereof at both the supply leg and the free end, which method and apparatus is inexpensive, fast and reliable. Further objects of this invention are to provide a method and means for aligning plugs, advancing them to a working position, securing them at the working position to hold them physically in a fixed position and to provide an electrical connection thereof, and for advancing them from the working position upon completion of the working cycle; which method and means are efficient, reliable, inexpensive and have a high production rate. Another object of this invention is to provide a method and apparatus for effecting the electrical connections of bridge wires wherein there is a minimum of waste of the wire.

Briefly, the present invention comprises rotatably indexing a supply spool of wire to release a predetermined increment of wire, and advancing the wire through a conduit by means of fluid moving through the conduit and coupled thereto by fluid drag. The outlet of the conduit is disposed adjacent the working position and is directed across the working position. On the opposite side of the working position from the outlet of the conduit there is disposed the inlet of a suction tube which draws in and holds the end of the wire. Wtih the wire thus held and accurately positioned, it is connected to the plug located at the working position by means of a welding head having a pair of spaced welding points which descend on the lead of the wire, depress it onto the plug and weld the same.

In order to sever the supply leg of the wire as well as the free leg from the weld point to the free end, both portions of the plug, that is, the two bridged elements of the plug, are grounded and an electric charge is passed through both the supply leg and the free leg of the wire to sever them by burning. Since the legs are connected to the plug at the weld points and since both of the bridged elements of the plug are grounded, the legs are burned off close to the plug while none of the current is passed through the bridge wire.

The means for clamping or gripping the plug at the work station and for effecting the desired electrical connection comprises a collet having split arms that are normally sprung open to receive the shank of the plug and are cammed inwardly to grip the shank of the plug as the collet is forced upwardly. The sleeve portion of the plug is electrically grounded by a plate overlying the plug and against which it abuts as the plug is moved upwardly by the continued motion of the collet after the arms thereof are closed on the shank of the plug. The plugs, which are fed to the device in an oriented manner, are fed individually into the working position by a star wheel which may be indexed angularly by a stepping motor. The star wheel, the gripping mechanism and the wire feed are controlled in timed sequence to define an operating cycle by means such as a plurality of timing cams on a timing shaft.

Further objects of this invention will be apparent from the following description of a preferred embodiment and with reference to the accompanying drawings, in which:

FIG. 1 is a fragmentary elevational view of a machine embodying this invention with portions thereof broken away and in section.

FIG. 2 is fragmentary side elevational view of the machine of FIG. 1.

FIG. 3 is a top plan view of the wire feeding mechanism of the machine of FIG. 1 with the cover removed.

FIG. 4 is a detail view illustrating the working position of the machine in top plan.

FIG. 5 is a fragmentary and schematic illustration of the wire handling elements at the working position and the circuit for electrically severing the wire.

FIG. 6 is a fragmentary sectional view taken substantially on the line 6—6 of FIG. 2.

FIG. 7 is a fragmentary detail view in section of the plugs and the elements at the second working position of the machine of FIG. 1.

FIG. 8 is a detail sectional view of a plug processed by the machine in accordance with this invention.

With reference to the drawings, there is illustrated a preferred embodiment of the present invention that is mounted upon a support 1 in the form of a flat and horizontally disposed tablelike member. The support 1 has a cut-out 2 extending vertically therethrough that is spanned by a plate 3.

Mounted upon the plate 3 is a block 4 having a track 5 longitudinally thereof and opening onto the top surface 6 of the block. The track 5 is shaped to receive the work piece which, in the illustrated case, is a plug 7 having a centrally disposed shank 8 surrounded in spaced relation by a sleeve 9 and having insulation 10 interposed between the same. At the base of the plug 7, which is the upper end in FIG. 8, the shank 8 is co-planar with the end of the sleeve 9. The present invention is directed to placing a bridge wire 11 across the shank 8 and the sleeve 9 and connecting the same thereto at the points 12 and 13 respectively, which points in the illustrated embodiments are in the nature of welds which are generated by heat and pressure.

The plugs 7 are directed into the track 5 of the block 4 by a chute 14 having a track 15 that corresponds to the track 5 and is aligned therewith so that the plugs passing from the track 15 enter the track 5. The plugs 7 are fed into the track 15 in any suitable manner (not shown) which may comprise for example a conventional apparatus for picking up and orienting the plugs, or may comprise tubes in which the plugs are stacked in the desired manner.

The track 5 is dimensioned to receive each plug 7 with the base, that is, the end that is to receive the bridge wire 11, disposed substantially in the plane of the top surface 6 of the block 4. The plugs 7 are pushed along the track 5 by the succeeding plugs and advance until they are stopped by a star wheel 16 (FIG. 4), one arm or tooth of which obstructs the track 5. The star wheel 16 is seated in a cut-out 17 (FIG. 4) in the top surface 6 of the block 4 so that the top surface of the star wheel is substantially flush with the top surface 6 (FIG. 6). The star wheel 16 is mounted upon the upper end of a shaft 18 that is journaled in the block 4 and extends through an aperture in the plate 3. Beneath the plate 3, the shaft 18 is coupled by a collar 19 to the shaft 20 of a stepping motor 21 which is supported by a collar 22 that is secured in the cut-out 2 in the table 1. The star wheel 16 has teeth 23 that are sufficient in number to advance the plug 7 individually to the working position, which number is also equal to the number of steps per revolution of the motor 21. In the illustrated form, there are ten teeth 23 on the star wheel 16 and there are ten steps per revolution of the motor 21.

The plugs 7 are secured in the working position by a clamping mechanism comprising a clamping element 24 (FIG. 6) which may be in the form of a collet that is split part-way longitudinally along the axis to provide a base 25 and a pair of upstanding arms 26 that are formed with cut-outs 27. The clamping element 24 is inserted into a bore 28 extending upwardly through the block 4 on an axis intersecting the track 5 centrally thereof and serves to define the working position of the apparatus. The bore 28 extends into the track 5 to the shoulder between the bottom of the wide upper portion of the track that receives the sleeve 9 of the plug 7 and the narrow lower portion that receives the shank 8 of the plug 7. At its upper end the bore 28 has a beveled cam surface 29 that cooperates with a comparably beveled surface at the free ends of the arms 26 to cam the same inwardly as the clamping element is forced upwardly. The arms 26 are normally sprung apart a distance corresponding to the width of the narrow portion of the track 5 that receives the shank 8 of the plug 7 and are aligned therewith to receive the shank 8 of a plug 7 that is moved into the working position. As the clamping element is forced upwardly, the free ends of the arms 26 are forced inwardly by the cam surface 29 to grip the shank 8 of the plug.

The means for forcing the clamping element 24 upwardly comprises a coil spring 30 disposed in the bore 28 below the base 25 of the clamping element. At its lower end, the spring 30 bears against the plate 3 which, for assembly purposes, may be provided with a bore 31 that is closed by a threaded plug 32. The element 24 is forced downwardly by a lever 33 that extends through the cut-outs 27 in the arms 26 of the clamping element 24 and through a vertical slot 34 in the block 4 that intersects the bore 28 axially. The lever 33 has a clearance opening 35 for the shaft 18 and, at its one end, is pivotally mounted by a pivot pin 36 inserted into the block 4 from the end on an axis transverse to the axis of the clamping element 24. The lever 33 engages the element 24 through a screw 37 threaded through the base 25 and constituting an adjustable abutment. When the free end of the lever 33 is depressed, the clamping element 24 is depressed against the spring 30 and the free ends of the arms 26 are free to move to their open position. When the lever 33 is released, the spring 30 forces the element 24 upwardly to close the arms 26 upon and thereby seize the shank 8 of the plug 7.

The free end of the lever 33 is operated by an air cylinder 38 that is secured to the block 4 and has a piston rod 39 (FIG. 1) connected at its end to a crank arm 40 upstanding from an actuating shaft 41. The shaft 41 is arranged with the axis thereof parallel to the pivot axis of the lever 33, that is, parallel to the axis of the pivot pin 36, and is journaled in a bearing block 42 that in effect constitutes an extension of the block 4. At its end opposite from the crank arm 40, the shaft 41 has a crank arm 43 that is connected by a link 44 with the lever 33 at a point adjacent the free end thereof. The link 44 as shown comprises a bolt threaded through an aperture in the crank arm 43, which bolt extends loosely through an enlarged hole 45 in the lever 33, and has an abutment 46 in the form of a pair of locked nuts on the end thereof. When the cylinder 38 is actuated to force the piston rod 39 outwardly, the shaft 41 is rotated clockwise as seen in FIG. 1, and thus the free end of the lever 33 is pulled down.

A micro-switch 47 is mounted on a bracket 48 upstanding from the plate 3 and is adapted to be closed by a resilient actuating finger 49 engaged by the lever 33 when it is depressed. The switch 47 is adapted to initiate the next step in the cycle of the apparatus as is more fully explained hereinafter.

Both the shank 8 and sleeve 9 of the plug 7 are positively grounded in the working position, the shank 8 being grounded by the clamping element 24 that seizes the same, and the sleeve 9 being grounded by a strip 50 secured to the top surface 6 of the block 4 and having an edge partially closing the open top of the track 5. The strip 50 extends over the top of the track 5 an amount sufficient to overhang a shoulder formed in the periphery of the sleeve 9 at the top thereof and has a thickness to position the upper surface thereof substantially flush with the base of the plug 7. When the plug 7 is forced upwardly by the clamping element 24, the sleeve 9 is pushed against the strip 50 and thus grounded. The strip 50 also serves to hold the plugs 7 down in the channel 5 and thus prevents them from becoming accidentally disoriented or dislodged as they are moved along.

After a plug 7 is moved into the working position and clamped therein, a length of wire is laid across the base of the plug 7 and is welded at 12 and 13 to the ends of the shank 8 and sleeve 9. The means for feeding and positioning the wire comprises a stepping motor 51 (FIG. 3) mounted upon a platform 52 that is carried by a base member 53 that is in turn secured to the support 1 by a bracket 54. The motor 51 has a shaft 55 on which is mounted a spool 58 upon which a supply of wire 59 is wound. The spool 58 is coupled to the shaft 55 by nuts 56 and 57 so that when an increment of rotation is imparted to the shaft 55 by the motor 51, the spool 58 is correspondingly turned to unwind and thereby release an increment of the wire 59.

From the spool 58, the wire 59 is directed into the input end of a wire conduit means 60 which comprises a tube 61 and a conduit 62 leading from the tube 61 to a nozzle 63. An air supply tube 64 intersects the tube 61 at an acute angle and is connected at its free end by a conduit 65 to a source of air under pressure (not shown) whereby a flow of air is established in the conduit means 60 toward the free or output end thereof at the nozzle 63. The air must be dry with respect to moisture, with vapors and other materials which could condense in the conduit means 60, the conduit 62, or the nozzle 63 and thus prevent free movement of the wire therethrough. A toroidal wear member 66 is mounted internally of the tube 61 at the wire input end thereof. This wear member 66 also aids in maintaining the flow of air outwardly of the tube 60 in the direction toward the output end thereof by partially closing the wire input end. The outlet of the nozzle 63 may be triangular with two equal sides and a relatively short side whereby a larger volume of air can be used to move the wire through the nozzle 63 while still providing an accurate positioning of the wire at the stream of maximum flow adjacent to the short side.

On the opposite side of the working position from the nozzle 63, there is provided a suction tube 67 which is connected continuously at its one end by a conduit 68 to a vacuum source (not shown) and has its open intake end disposed adjacent to the working position, whereby it will draw in and hold the free end of the wire 59.

During operation, the supply of fluid under pressure to the tube 64 is continuous so that there is a continuous flow of fluid in the conduit means 60 toward the output end thereof. Thus, there is fluid drag or tension imposed continuously on the length of the wire 59 in the conduit means 60 urging it toward the nozzle 63, which tension in a function of the velocity of the fluid flow in the conduit. With extremely fine wire, the fluid flow is maintained at a relatively low level so that the wire is floated in the conduit means and only a minimum tension is imposed thereon. In particular, the tension on the wire 59 is sufficiently light that the wire 59 is not strained and the electrical characteristics thereby altered.

With the fluid imposing a tension on the length of the wire 59 in the conduit means 60 that tends to move it toward the output end thereof, the spool 58 is indexed angularly by the motor 51 to unwind and thus release an increment of the wire 59 from the spool. The length of the wire 59 in the conduit means 60 is then advanced by the fluid flow by an amount equal to the length of released increment and the free end of the wire, which was at the output end of the nozzle 63 at the beginning of the cycle is advanced outwardly of the nozzle 63. The length of the released increment is made long enough for the free end of the wire to pass over the base of the plug 7 and to provide a sufficiently long free end to be drawn in and held by the suction tube 67.

The nozzle 63 is arranged to direct the stream of fluid discharged therefrom across the working position, or more particularly, across the base of the plug 7. The intake or open end of the suction tube 67 is disposed immediately adjacent to the path of the stream of fluid discharged from the nozzle 63 so that the intake thereof will draw in the free end of the wire 59 and hold the same. The nozzle 63 and the suction tube 67 are also arranged with the axes thereof at an angle so that, with the free end of the wire 59 held by the suction tube, the wire is drawn against and bent around the lip 69 of the nozzle 63 and the lip 70 at the intake of the suction tube 67. The lead of the wire 59 over the base of the plug 7 is thus accurately held and positioned and the wire is grounded at both lips 69 and 70 for severing the same electrically as hereinafter described.

The lead of the wire 59 across the base of the plug 7 is connected to the plug 7 at the points 12 and 13 by means which in the illustrated embodiment comprises a conventional welding apparatus 71. Inasmuch as the welding apparatus is a commercially available device and the details thereof form no part of the present invention, it is illustrated only in outline and hereinafter described only insofar as it is believed to be necessary in order to understand this invention. Thus, the welding apparatus 71 comprises a pair of welding heads 72 carried by a rod 73 mounted for endwise movement in a housing 74. The housing 74 is carried by a support 75 that is in turn mounted upon the base member 53. The rod 73 is normally biased endwise into its inoperative position away from the working position and is moved into its working position by an air cylinder 76 having a draw rod 77 connected to one end of a rod 78. The rod 78 extends upwardly through appropriate bores in the base member 53 and support 75 into the housing 74. While not herein illustrated, the rod 78 is connected within the housing 74 to the rod 73 through an adjustable coupling whereby the rod 73 is moved downwardly with the rod 78 to bring the points of the welding heads 72 into contact with the base of the plug 7 at the desired welding points corresponding to the points 12 and 13, and to develop the selected welding pressure. An electrical welding charge is then passed from the welding heads 72 through the wire and the plug to ground to effect a welded connection at the points 12 and 13. Grounding of the plug 7 at this time is effected by the clamping element 24 and the strip 50.

The two welding heads 72 are preferably supplied with electrical power in parallel electrical circuits from a common source, thereby avoiding the expense, space requirements and alignment of two separate power sources. In a parallel circuit however, the electrical connections to both the shank 8 and the sleeve 9 must have the same electrical properties to avoid an unbalance in the power supplied to the two welding points 12 and 13 which could produce for example a loose connection at one of these points. There is thus a balanced relationship between the electrical properties of the connection between the shank 8 and the arm 26 of the clamping element 24, which is a pair of line contacts, and the electrical properties of the connection between the sleeve 9 and the strip 50.

The accurate positioning of the lead of the wire 59 from the output end of the nozzle 63 across the base of the plug 7 insures that the points of the welding heads 72 will contact the wire as they descend and will thus force the same against the base of the plug 7. The gentle and yielding holding force applied to the wire by the suction tube 67 permits the path of the wire to be extended as it is pushed against the plug 7 by the heads 72 without imposing a strain thereon.

After the wire 59 is welded to the plug 7 at the points 12 and 13, the supply leg and the free end thereof beyond the point 12 is severed to leave the bridge wire 11. In accordance with this invention, the wire is severed electrically by means of a charge applied thereto by a source illustrated schematically at 79 in FIG. 5 that is grounded at one side and is connected at its other side to a switch 80 that is connected by a lead 81 to both the nozzle 63 and the suction tube 67. The wire 59 is electrically connected to both the nozzle 63 and suction tube 67 by engagement at the lips 69 and 70 respectively. The wire is also connected to ground through the connection points 12 and 13 and the shank 8 and sleeve 9 of the plug 7, which are grounded by the clamping element 24 and strip 50. With a sufficiently high charge, the free end of the wire 59 between the lip 70 of the suction tube 67 and the connecting point 12, and the supply leg of the wire 59 between the lip 69 of the nozzle 63 and the connecting point 13 are heated to incandescence and are thus severed by burning. Because the portion of the wire 59 that forms the bridge wire 11 is grounded at both ends at the points 12 and 13, this charge does not pass through the bridge wire 11. The supply leg of the wire 11 is severed substantially at the lip 69 of the nozzle 63 and the free end thereof remains at this point until an increment of wire is fed upon the next cycle. To prevent the possibility that the wire 59 may be severed within the tube 61 as would occur for example if the wire were momentarily uncoupled electrically from the nozzle 63, the conduit means 60 and spool 58 are insulated from the platform 52, or the platform 52 may itself be of an insulating material.

Upon the next cycle of the apparatus, the plug 7 with the bridge wire 11 is advanced by the star wheel 16 along the track 5 from the working position and into a track 82 of a chute 83 that is mounted on the support 1 by a bracket 84. At its discharge end, the chute 83 is disposed with its track 82 aligned with a track 85 in a block 86 that defines a second working position at which the electrical resistance across the bridge wire 11 between the shank 8 and sleeve 9 of the plug 7 is checked automatically. In the illustrated apparatus, the block 86 is mounted upon a plate 87 that is secured in a depending manner to the support 1 by a bracket 88.

The block 86 is similar to the block 4 and the means for indexing the plugs 7 individually to the second working position and for clamping the same at the working position are also the same as that associated with the block 4. Thus, there is a star wheel 89 indexed angularly by a stepping motor 90, and a clamping element 91 that is in all essential respects like the clamping element 24 and is opened and closed by a lever 92 connected by a link 93 to a crank arm 94 secured to a shaft 95. The shaft 95 is journaled in a bearing block 96 secured to the block 86 and is rocked by a crank arm 97 adjustably connected to the threaded piston rod 98 of an air cylinder 99. A strip 100 like the strip 50 is secured to the top of the block 86 and partially overhangs the channel 85 to prevent accidental displacement of the plugs 7. The strip 100 is however non-conductive so that the sleeve 9 of the plug 7 is not connected electrically to the shank 8 through the block 86. For the same purpose, there is provided a pair of insulating elements 101 (FIG. 7) extending longitudinally of the track 85 at the base thereof, which elements 101 may be simply lengths of a monofilament of synthetic plastic material secured at their ends such as by screws 102 to the plate 87. The monofilaments are particularly suitable since they are not only inexpensive and easy to install, but also, when they fail such as through wear by the plugs 7, they fail instantaneously by breaking and do not pass through a period of progressive failure during which they cause a malfunctioning of the equipment.

The electrical resistance between the shank 8 and sleeve 9 of the plug 7, which is the resistance across the bridge wire 11, is measured by a conventional meter 103 which, as shown in FIG. 7, is connected at one side to the shank 8 through the clamping element 91 and at the other side to the sleeve 9 through a wiper 104. The meter 103 is provided with output leads 105 which, through appropriate circuiting (not shown) are designed to actuate an air cylinder 106 of a reject mechanism 107 whenever the resistance of the bridge wire 11 is outside the desired range.

The illustrated reject mechanism 107 comprises a supporting member 108 secured at the output end of the block 86 and carrying an input chute 109 having a track 110 that forms a continuation of the track 85. At the output side of the chute 109 is a slide member 111 mounted on the supporting member 108 for endwise movement transversely thereof. The slide member 111 has a through track 112 which, in one position of the slide member 111, is aligned with the track 110 of the chute 109 to receive the plugs 7 and is in turn aligned at its output and with the track 113 of a chute 114 that will carry the plugs 7 to a subsequent operation or to a storing or packing tube. Whenever the meter 103 tests a plug 7 which falls outside the predetermined tolerance, the air cylinder 106 is actuated to force the slide member 111 to the right in FIG. 1 to align the input end of a second track 115 in the slide member 111, which is the reject track, with the output end of the track 110. The reject track 115 is angled laterally in the slide member 111 so that the output end thereof is displaced from the input end of the track 113 and is aligned with a reject track 116 in the chute 114. The reject track 116 opens on the side of the chute 114 and is arranged to deliver the rejected plugs into a discharge conduit 117.

One of the significant advantages of this invention is that the amount of waste of the wire 59 is substantially reduced over that experienced in the narmal hand operation because of the reduced number of rejects, and because of the more precise handling, that is, because a minimum excess of wire is required at the supply leg thereof while the excess at the free end need be only enough for the suction tube 67 to attract and to hold the same. The wire normally used for bridge wires in blasting caps is tungsten with a diameter, as mentioned above, of less than 0.0002". This wire is relatively expensive and a significant reduction in waste produces a significant savings in the operation.

Cycling of the apparatus described above may be effected by any suitable timing mechanism such as a shaft having a plurality of timing cams so that as the shaft is rotated at a fixed speed, the cams individually actuate control elements such as switches for stepping the motors 21 and 90 for indexing the plugs 7 into and out of the working position, and for stepping the motor 51 for unwinding a length of the wire 59 from the spool 58. The timing cams also actuate the air cylinders 38 and 99 to clamp and release the plugs 7 at the working position and which in turn, through the microswitch 47 and a comparable microswitch 118 on the plate 87, actuate respectively the air cylinder 76 and thus the welding apparatus 74 and the testing apparatus.

Because of the magnetic field established about the welding heads 72, it has been found that the block 4 could become magnetized and would thus seize the plugs 7 in the track 5. To avoid this, the block 4 is preferably made of a non-magnetic material, particularly a material such as a hard and non-magnetic grade of stainless steel which also has good wear properties. Because of wear, the arms 26 of the clamping member 24 as well as the most active wear points along the block 4, such as at the star wheel 16, may be provided with wear-resistant inserts such as inserts of tungsten carbide.

What I claim and desire to protect by Letters Patent is:

1. Apparatus for working fine wire, said apparatus having means defining a working position and wire feed means for feeding a continuous length of wire from a supply to the working position and for exerting a holding force on the free end of the wire at the working position, said wire feed means comprising conduit means having an input end through which the length of wire passes endwise into the conduit means and having an output end disposed adjacent to the working position and arranged to direct a stream of fluid discharged therefrom across the working position, means for inducing a flow of fluid in said conduit means in the direction toward the output end and thereby imposing a fluid drag on the wire within the conduit means and impelling the same endwise longitudinally of the conduit means toward the output end, and wire supply means for holding the wire against the fluid drag imposed thereon and for releasing a predetermined length of wire upon each cycle, and holding means for attracting and imposing a holding tension on the free end of the wire discharged at the outlet end of said conduit means such that the length of wire extends across the working position, said holding means comprising suction means having an intake disposed adjacent to the working position on the side thereof opposite from the outlet end of the conduit means.

2. Fine wire working apparatus in accordance with claim 1 having working means for performing a work operation at the working position, and means for severing the wire adjacent to the output end of the conduit means upon completion of the work operation, said means for defining the working position comprising a work piece feed means for advancing work pieces individually to the working position and for removing a completed work piece from the working position simultaneously with feeding a new work piece.

3. Fine wire working apparatus in accordance with claim 2 having clamping means for securing the work pieces at the working position.

4. Fine wire working apparatus in accordance with claim 3 in which said clamping means includes means for securing a work piece having a pair of concentric and electrically insulated portions and further includes means for electrically grounding both of the work piece portions simultaneously with securing the work piece.

5. Fine wire working apparatus in accordance with claim 4 in which said clamping means comprises an endwise movable clamping element having clamping arms normally spaced apart to receive a central shank of a work piece, cam means for urging said arms together in clamping relation as the clamping element is moved endwise toward the work piece, and a strip partially overhanging the working position for abutting the outer sleeve of the work piece and thereby electrically grounding the same as the work piece is moved by the clamping element.

6. Fine wire working apparatus in accordance with claim 5 in which said working means comprises means for effecting an electrical connection of the bridge wire to the electrically insulated portions of a work piece.

7. Fine wire working apparatus in accordance with claim 2 having control means for automatically cycling the apparatus whereby the apparatus is continuously operated through successive work cycles wherein the work piece feed means is actuated to remove a completed work piece from the working position and simultaneously to introduce a new work piece, the wire feed means is actuated to feed a length of wire across the base of the new work piece, the working means is actuated to perform the work operation, and the severing means is actuated to sever the wire adjacent to the output end of said conduit means.

8. Fine wire working apparatus in accordance with claim 1 in which said wire supply means comprises a spool upon which the supply of wire is wound, means for mounting said spool for rotation and for imparting a predetermined increment of angular motion to said spool upon each cycle to unwind and thereby release a predetermined length of wire from said spool.

9. Fine wire working apparatus in accordance with claim 1 in which said conduit means comprises a wire inlet portion including an inlet end in the form of an inlet tube, a wire outlet portion including an outlet end in the form of a nozzle, and a conduit interconnecting said tube and said nozzle, and said means for inducing a flow of fluid in said conduit means comprises an air tube intersecting said inlet tube at an acute angle whereby fluid discharged from air tube into said inlet tube is directed substantially in the direction toward the outlet end thereof.

10. Fine wire working apparatus in accordance with claim 9 in which said inlet tube has a toroidal guide element internally thereof at the inlet end for guiding the wire and partially closing the inlet end.

11. Fine wire working apparatus in accordance with claim 9 in which the intake of said suction means is disposed adjacent to but out of alignment with the discharge of said nozzle whereby a length of wire from the outlet of said nozzle to the intake of said suction means is in contact with the edges of said nozzle and intake.

12. Fine wire working apparatus in accordance with claim 1 having working means at the working position for securing and electrically connecting the wire at a pair of spaced points on the base of a work piece, and means for severing the supply leg of the wire between the outlet of the conduit means and the adjacent connection point on said work piece and for severing the free end thereof beyond the other connection point on said work piece, said severing means comprising means for electrically grounding the work piece, means engaging the supply leg and the free end of the wire adjacent to the output end of the conduit means and the intake of said suction means respectively and forming an electrical connection therewith, and means for passing an electrical charge through the supply leg and free end of the wire from the electrical connection to the adjacent wire connection point on said work piece for heating said wire and severing the same by burning.

13. Fine wire working apparatus in accordance with claim 12 in which the intake of said suction means is disposed adjacent to but out of alignment with the discharge of said nozzle whereby a length of wire from the outlet of said nozzle is in contact with the edges of said nozzle and intake thereby effecting said electrical connection with the supply leg and the free end of the wire.

14. Apparatus for applying bridge wires across a pair of electrically insulated portions at the base of a plug and of severing the supply leg and free end of the wire from the bridge wire comprising, means for locating a plug in a working position and electrically grounding both of the portions of the plug, means for feeding a length of wire across the base of the plug comprising a nozzle through which the wire is moved by fluid drag from a continuous length, and suction means at the opposite side of the working position from said nozzle for drawing in and holding the free end of the wire, means for connecting the wire to both of the insulated portions of the plug and thereby providing a bridge wire across the same and wire ends outwardly of the bridge portions, and means electrically connected to both of said wire ends by the engagement of said wire with said nozzle and with said suction means for passing an electrical charge therethrough to said plug and thus to ground for heating said wire ends and thereby burning them off.

15. Fine wire working apparatus in accordance with claim 12, including a member having a channel for receiving a succession of work pieces, each having said spaced points and oriented for electrically connecting said wire as described, and along which they are advanced to the working position; indexing means for moving said work pieces individually from the channel to the working position and simultaneously removing the preceding work piece from the working position; a clamping element having clamping arms normally spaced apart to receive a clamping portion of each work piece as it is advanced from the channel to the working position; means for mounting said clamping element for endwise movement along a line through the working position; cam means cooperating with said arms for urging the same together in clamping relation upon endwise movement of said clamping element toward the working position and for permitting the same to relax and thereby open upon endwise movement of said clamping element away from the working position; a plate partially overhanging the working position on the side opposite from said clamping element for abutting a peripheral portion of the adjacent face of each said work piece to ground same upon movement of the work piece in the direction defined by the axis of movement of the clamping element; and means for moving the clamping element endwise between an inoperative position wherein the arms thereof are separated to receive the clamping portion of each work piece and a clamping position wherein the arms are in clamping relation relative to the clamping position of the work piece to thereby clamp and electrically ground the work piece when it is urged toward said plate with said peripheral portion against the plate.

16. Apparatus in accordance with claim 15 adapted for handling work pieces comprising plugs having a sleeve-like portion at the periphery thereof and a shank disposed centrally of and electrically insulated from the sleeve-like portion, said shank having one end thereof flush with one end of the sleeve-like portion to define the base of the plug and having the other end extending beyond the end of the sleeve-like portion to define the clamping portion of the plug, whereby said shank is clamped and grounded by said clamping element and said sleeve-like portion is grounded by said plate.

References Cited
UNITED STATES PATENTS

| | | | |
|---|---|---|---|
| 2,388,754 | 11/1945 | Martindell | 219—117 |
| 2,631,213 | 3/1953 | Martines | 219—79 |
| 2,662,153 | 12/1953 | Günther | 219—117 |
| 2,667,557 | 1/1954 | Herzog | 219—68 |
| 2,994,244 | 8/1961 | Hay | 219—68 X |
| 3,316,382 | 4/1967 | Schumaker et al. | 219—79 |
| 3,319,859 | 5/1967 | Miller | 226—97 X |
| 3,392,894 | 7/1968 | Standefer | 226—97 X |

JOSEPH V. TRUHE, Primary Examiner

L. A. SCHUTZMAN, Assistant Examiner

U.S. Cl. X.R.

29—203; 226—97